United States Patent [19]

Brigden et al.

[11] Patent Number: 4,473,756
[45] Date of Patent: Sep. 25, 1984

[54] AC UNINTERRUPTIBLE POWER SYSTEM

[75] Inventors: Wayne H. Brigden, Santa Rosa; Gary M. Shatto, Sebastopol, both of Calif.

[73] Assignee: Caloyeras, Inc., Forestville, Calif.

[21] Appl. No.: 497,108

[22] Filed: May 23, 1983

[51] Int. Cl.³ .............................................. H02J 4/00
[52] U.S. Cl. ......................................... 307/66; 307/86
[58] Field of Search ....................... 307/64, 66, 85, 86

[56] References Cited

U.S. PATENT DOCUMENTS

| 3,991,318 | 11/1976 | Servas et al. | 307/64 |
| 4,177,389 | 12/1979 | Schott | 307/64 |
| 4,400,625 | 8/1983 | Hussey | 307/66 |

Primary Examiner—Roy N. Envall, Jr.
Assistant Examiner—Derek Jennings
Attorney, Agent, or Firm—Melvin R. Stidham

[57] ABSTRACT

A system to provide substantially uninterruptible AC power. Line voltage is applied to a load through a solid state electronic switch. A squarewave inverter powered by batteries in connected across the load. When line power is reduced to a predetermined level, the switch opens disconnecting the line, and after a short time delay of less than a millisecond, the inverter starts. Upon restoration of normal line power, the process is reversed; the inverter stops and after a like short time delay, the switch closes reconnecting the line.

17 Claims, 4 Drawing Figures

CONTROL CIRCUIT POWER SUPPLY

AC UNINTERRUPTIBLE POWER SYSTEM

BACKGROUND OF THE INVENTION

The reliability of digital circuitry, such as that used in computer data systems, is dependent upon the consistency of its input power. Power outages of even a few milliseconds can cause errors in data, particularly when the line voltage is low and the outage occurs just prior to the sinewave peak.

Numerouse backup power systems have been developed in an attempt to solve this problem. Most such systems use circuitry that switches too slowly between normal and backup operation to safeguard the computer data adequately. Others do not provide digital status signals or allow computer control of the alternate power system.

OBJECT OF THE INVENTION

It is an object of this invention to provide a substantially uninterruptible power system (UPS) for AC circuits.

It is a further object of this invention to provide an AC UPS including an alternate system that is automatically activated in the event of power failure.

It is a further object of this invention to provide an AC UPS that produces digital status signals indicating the state of line power and the condition of the alternate power system batteries.

It is a further object of this invention to provide an AC UPS wherein the alternate battery powered system may be shut down by computer signal.

It is a further object of this invention to provide an AC UPS that can be added to existing electronic equipment.

It is a further object of this invention to provide an AC UPS that automatically switches to a battery powered alternate system when line power fails, and recharges the batteries of the alternate system when line power is restored.

It is a further object of this invention to provide an AC solid state switch which can be opened or closed at any point in the AC cycle.

Other objects and advantages of this invention will become apparent from the description to follow, particularly when read in conjunction with the accompanying drawings.

SUMMARY OF THE INVENTION

The UPS of this invention provides substantially continuous AC power to digital electronic equipment even during single or multiple line power failures. It includes a battery as a source of alternate power when the line power fails, with an oscillator-inverter circuit to convert the battery power into squarewave line voltage at an output transformer. An isolated AC solid state switch disconnects the line power while the alternate power system is activated. Also included is a dual line level sensor which generates a digital signal when the line voltage falls below a reference level and generates an opposite digital signal when the normal line voltage is restored.

The system also includes two polarity sensitive control circuits, one for the solid state switch and the other for the alternate power system. A digital signal applied to these circuits is delayed a short but definite time (typically less than a millisecond) when the signal changes stae in only one of two opposite directions, so that activation of the alternate power system is delayed until after the switch opens, and closing of the switch is delayed until after the alternate power system is deactivated.

The system also includes a battery chager to recharge the battery only during normal line power operation, and two internal power supplies, one to power the switch and the other to power the control circuitry for the system. Each of these power supplies is energized by line power to alternate power, whichever is active at any given time. The transfer of power from these two sources is sufficiently fast that their output is essentially uninterrupted by transition from line to battery operation or vice versa.

In one embodiment of the invention, the system includes circuitry to provide status signals to the equipment being powered. One status signal indicates the operational mode, battery or line. The second status signal indicates battery conditions, low or normal.

DESCRIPTION OF A PREFERRED EMBODIMENT

The System as a Whole

Figure 1:
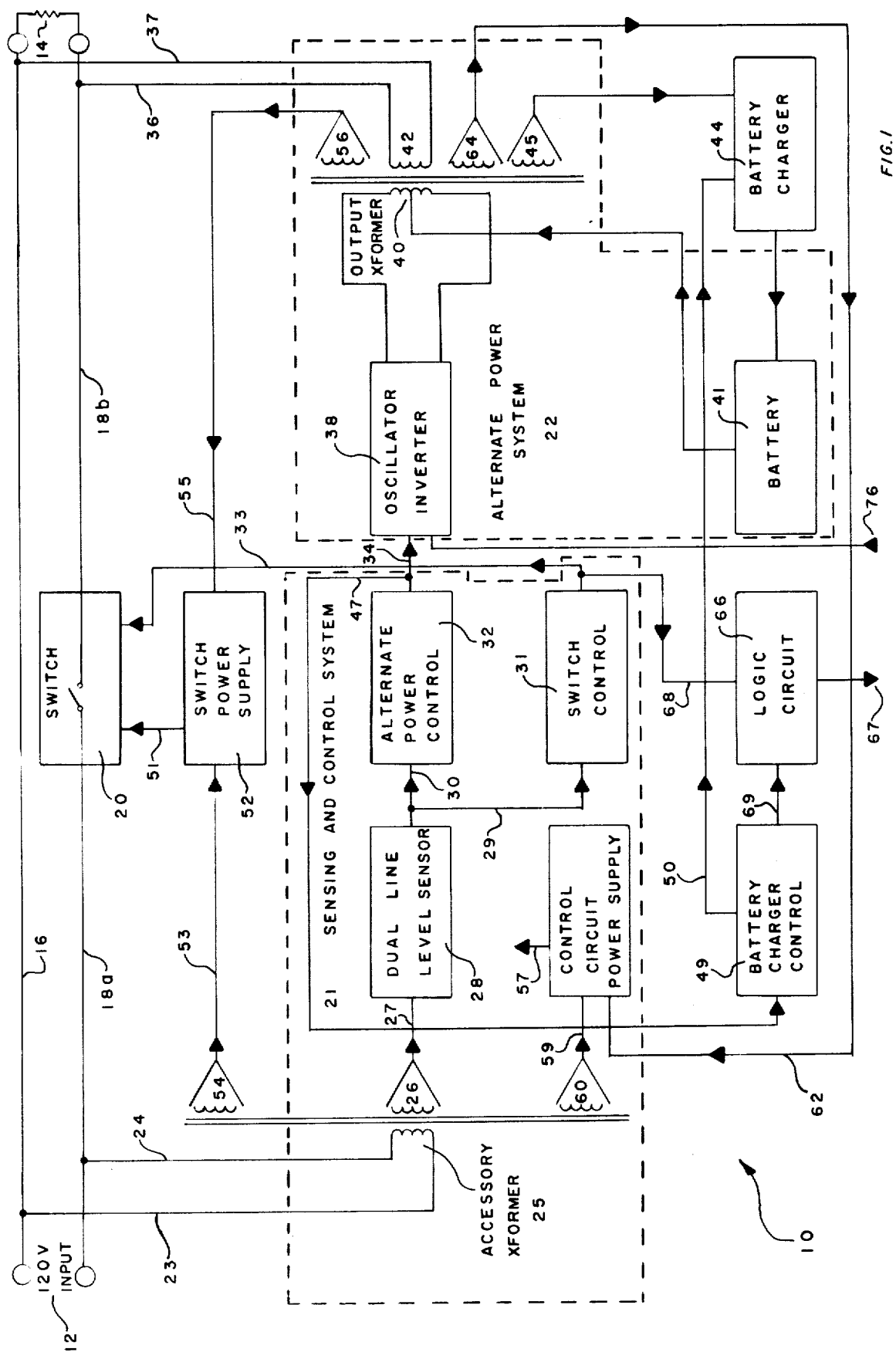
FIG. 1 is a block diagram of a preferred embodiment of the invention.

Referring now to FIG. 1 with greater particularity, the substantially uninterruptible power system 10 of this invention, is conditioned to monitor power delivered from a suitable AC source 12 to equipment or other load 14, such as a computer data system, which is highly dependent upon the continuity of the AC power delivered thereto. The AC voltage delivered at the source 12 may vary in sinusoidal fashion at a frequency of 50 or 60 Hertz, having a typical amplitude of 120 VRMS.

The power systm 10 includes line conductors 16 and 18a, b which are adapted to be interposed between the power source 12 and the load 14 to be protected, and includes a solid state switch 20, a sensing and control system 21 and a standby or alternate AC power system 22. In the sensing system 21, lines 23 and 24 are connected across the lines 16, 18a on the input side of the switch 20 to energize the accessory transformer 25. A winding 26 on the accessory transformer delivers through line 27 to dual line level sensor 28 a signal that is proportional to the level of voltage at the AC power source 12.

As will hereinafter be described, the dual line level sensor 28 compares the line level signal from winding 26 with a reference signal, and under normal line conditions delivers a "one" state signal through lines 29 and 30 to switch control circuit 31 and alternate power control circuit 32. In this normal condition, the "one" state signal received at the switch control circuit 31 is delivered as a "one" signal through line 33 to the switch 20 to maintain its closed position, while the alternate power control circuit 32 delivers a "zero" signal through line 34 to the alternate power systtem 22, maintaining its deactivated state.

Should the line level signal from winding 26 decrease below the reference level, indicating a loss of power at the source 12, the dual line level sensor 28 will detect this and deliver a "zero" signal through lines 29 and 30. Upon receipt of this signal, the switch control circuit 31 immediately delivers a "zero" state signal to open the switch 20. However, when the alternate power control circuit 32 receives such "zero" signal, it first imposes a time delay (to be described later) before it delivers a "one" signal to the alternate power system 22, activating it for delivery of the alternate AC current through lines 36 and 37 to the line conductors 16 and 18b. The time delay imposed by the alternate power control circuit 32 ensures that the switch 20 is opened before the alternate power system 22 is activated. This is a significant feature of the system 10, for without it the alternate power system 22 would destroy itself in attempting to energize the entire power distribution network.

When normal line voltage is restored and builds up above a second (higher) reference level, the output from the dual line level sensor 28 delivered to the control circuits 31 and 32 is changed back to a "one" state signal. On receipt of this signal, the alternate power control circuit 32 immediately delivers a "zero" status signal to deactivate the alternate power system 22, while the switch control circuit 31 now iimposes a time delay before it delivers a "one" status signal to close the switch 20, restoring normal line power to the load 14. As before, this time delay ensures tha the alternate power system will not destroy itself by attempting to energize the entire power distribution network.

The alternate power system 22 comprises an oscillator-inverter 38, including an output transformer 40. Power to the oscillator-inverter is supplied by a battery 41, and the AC output to lines 36 and 37 is delivered at the winding 42. The output transformer 40 typically has a squarewave output equal to the peak value of the sinewave line voltage, at a maximum 130 VRMS/184 Vpk. While this squarewave voltage is suitable for equipment using capacitor input power supplies, a different squarewave voltage would enable operation with choke input filters, or the output could be filtered to provide a sinewave output.

The battery 41 is charged from battery charger 44 and, in the preferred embodiment, input power to the battery charger is derived from a winding 45 of the output transformer 40. Under normal line conditions, with the oscillator-inverter 38 in the off state, the output transformer is energized by the sinewave line voltage applied to the winding 42 through lines 36 and 37. Thus, power is supplied from the winding 45 to the battery charger 44. By having the output transformer 40 perform this secondary function, the size of the accessory transformer 25 can be minimized without substantially enlarging the size of the output transformer 40.

When alternate power control circuit 32 delivers the "one" signal to activate the alternate power system 22, as above described, the same signal is also delivered through line 47 to the battery control 49 which, in turn, delivers a signal through line 50 to inactivate the battery charger 44 so as not to consume the battery power delivered by the alternate power system 22.

The switch 20 is powered by a switch power supply 52 via line 51. Switch power supply 52 is energized through line 53 from a winding 54 of the accessory transformer 25, i.e. from the power source 12, during normal line power operation, and through line 55 from a winding 56 of the output transformer 40 during alternate power operation.

Similarly, the control circuit power supply 58 is energized through line 59 from a winding 60 of the accessory transformer 25 during normal line operation and through line 62 from a winding 64 of the output transformer 40 during alternate power operation.

Also provided in the system 10 is a logic circuit 66 that provides status signals through line 67 to the equipment being powered. One status signal indicates the operational mode, whether battery or line, as determined by a signal from the switch control 31 through line 68. A second status signal from the battery charger control 49 through line 69 indicates the battery condition, whether low or normal. Provision is also made for input at 76 of a signal from the equipment being powered to deactivate the oscillator-inverter 38, as in the event of extended line power failure. The remaining energy in the batteries is thereby saved for future power outages which could occur shortly after restoration of normal line power at the source 12. This prevents complete depletion of the battery 41 during each long term power outage.

DESCRIPTION OF SYSTEM COMPONENTS

Sensing and Control Circuits

Figure 2:
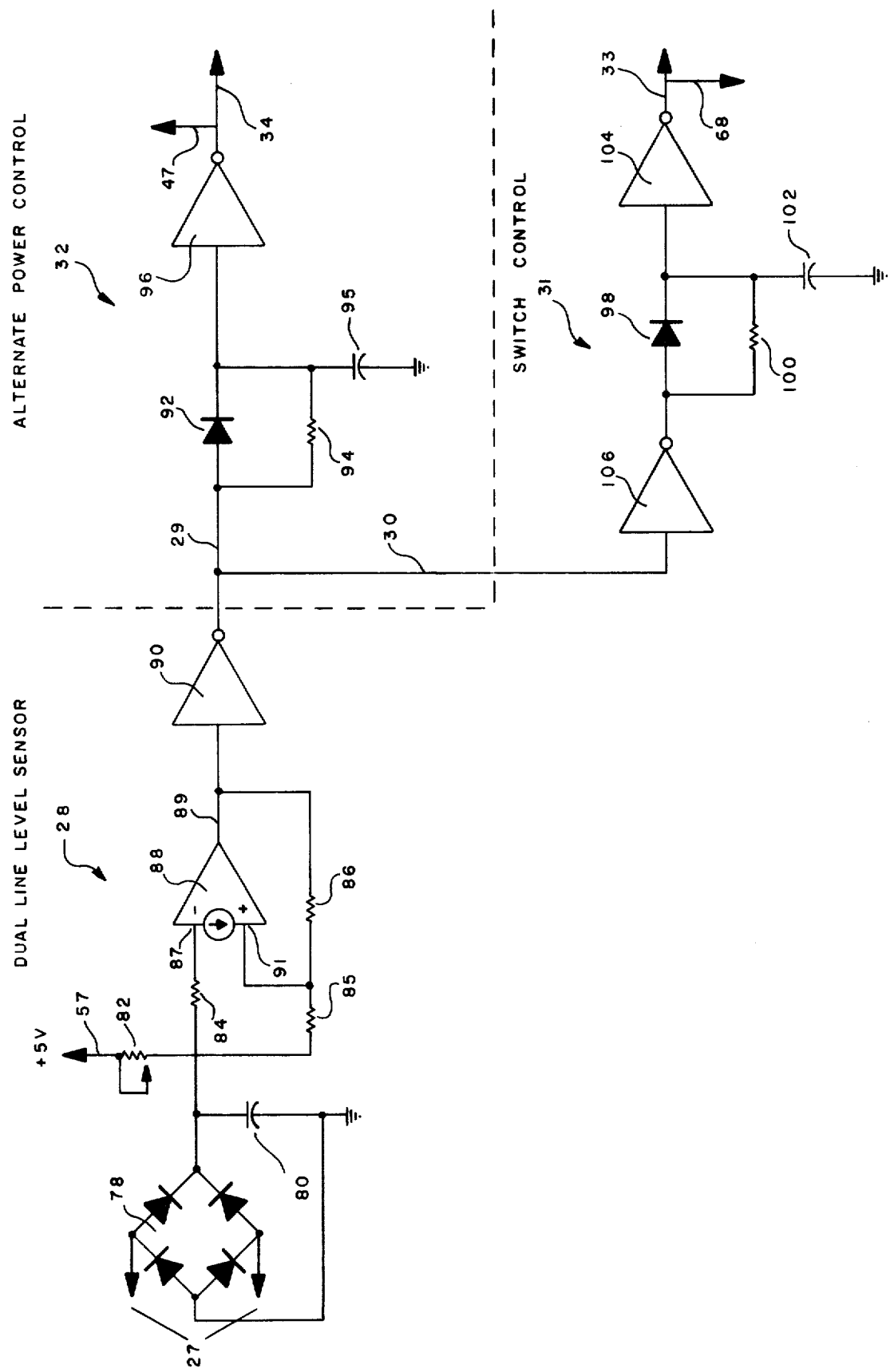
FIG. 2 is a schematic diagram of the dual line level sensor, the switch control circuit, and the alternate power control circuit.

Referring now to FIG. 2, the dual line level sensor 28, which receives a signal through line 27 from winding 60 on the accessory transformer 25 (FIG. 1) comprises a rectifier bridge 78, a capacitor 80, a potentiometer 82, resistors 84, 85 and 86, a Norton type differential amplifier 88 and a Schmitt trigger 90. A sense voltage, which is proportional to the input line voltage at the source 12, is applied to the rectifier bridge 78, and the output of the rectifier bridge 78 is applied to the capacitor 80. The capacitor 80 charges approximately to the peak value of the rectified sense voltage on each half cycle of the input wave form, and between the short intervals of charging at the peaks of the wave form, the capacitor 80 discharges, in an exponential manner, through the resistor 84 into the inverting input of the Norton amplifier 88. The current flowing into the inverting input 87 of the Norton amplifier 88 is compared to the current flowing into the non-inverting input 91, i.e. the reference current. The reference current is the sum of two currents: (1) that flowing through the potentiometer 82 and the resistor 85 from a fixed reference voltage of, say 5 volts, delivered by line 57 from the control circuit power supply 58 (FIG. 1) and (2) that flowing through the resistor 86 from the output 89 of the Norton amplifier 88.

As long as the currrent flowing from the resistor 84 to the inverting input of the Norton amplifier 88 exceeds that reference current, the output at 89 will be driven to its most negative limit by the Norton amplfier's high gain. This low or "zero" output signal is inverted by the Schmitt trigger 90 to deliver a high or "one" output. This represents the condition of normal line voltage.

When line voltage at the source 12, and hence, the rectified sense voltage applied to the capacitor 80, drops to the threshold level, as determined by the setting of the potentiometer 82, and the current delivered from resistor 84 to the inverting input of the Norton amplifier 88 falls below the reference current at the non-inverting input, the Norton amplifier 88 is driven to its most positive limit. When this high or "one" signal is applied to the input of the Schmitt trigger 90, its output becomes a low or "zero" signal. The Schmitt trigger's high gain, positive feedback feature eliminates any ambiguity as to whether the Norton amplifier output at 89 is interpreted as representing a normal or a low line condition.

A unique feature of the dual line level sensor 28 is that the voltage level at which it senses low line condition is lower than the level at which it senses a return to normal line condition. This hysteretic characteristic is necessary to eliminate the problem of oscillation which otherwise would occur when the line voltage hovers near the first threshold level. Without this feature, the sawtooth ripple voltage across the capacitor 80 and resulting sawtooth ripple current through resistor 84 would cause an unacceptable oscillation in the output signal.

The dual level sensing characteristic is accomplished by the connection of the resistor 86 between the input and output of the Norton amplifier 88. The current through this resistor is one of the two currents comprising the reference current into the non-inverting input of the Norton amplifier 88. Under normal line conditions, with the output of the amplifier low, the current through resistor 86 is less than in low line conditions when the output of the amplifier is high. The circuit thus has two threshold levels. By selection of the circuit resistors, any desired difference between the two levels can be obtained.

The exponential discharge of capacitor 80 through the resistor 84 is designed to be faster than the capacitor discharge of the power supplies in the digital equipment being powered and faster than the capacitor discharge of a "low line alarm circuit" typical of such equipment. Furthermore, the potentiometer 82 is adjusted such that the dual line level sensor 28 changes state at a line voltage above that which would trigger an alarm circuit or cause the digital equipment to malfuntion. Therefore, by proper design and adjustment, as explained above, the dual line level sensor 28 ensures generation of a signal which will open the switch 20 and turn on the alternate power system 22 prior to malfunction of the digital equipment or even the triggering of a low line alarm, as a result of low line voltage.

As previously described generally, the output of the dual level line sensor 28 is delivered through lines 29 and 30 to the control circuits 31 and 32 for the switch 20 and alternate power system 22, respectively. The alternate power control circuit 32 comprises a diode 92, a resistor 94, a capacitor 95 and a Schmitt trigger 96. Similarly, the switch control circuit 31 comprises a diode 98, a resistor 100, a capacitor 102 and a Schmitt trigger 104. However, interposed in line 30 is a digital inverter 106.

Under normal line conditions, the output of the dual line level sensor 28 from the Schmitt trigger 90 is in its high or "one" state and the capacitor 95 of the alternate power control circuit 32 will be charged through diode 92 and resistor 94 to this output voltage, same also being applied to Schmitt trigger 96. The output of the Schmitt trigger 96 is then in the "zero" state at line 34, leaving the alternate power system 22 deactivated (FIG. 1).

However when, as previously described, the output of the sensor 28 changes to is "zero" condition, as occasioned by falling line voltage, the capacitor 95 discharges through the resistor 94 causing the output of the Schmitt trigger 96 to change from a "zero" condition to a "one" condition. This activates the alternate power system 22 through line 34, and through line 47 turns off the battery charger control 49 (FIG. 1) as previously described.

The length of the time delay which occurs between the change of state of the Schmitt inverter 90 of the line level sensor 28, and the change of state of the Schmitt trigger 96, is determined by the capacitor 95, the resistor 94, and the input level at which the Schmitt trigger 96 changes its output from "zero" to "one" state. A time delay on the order of 200 microseconds is desirable as this enables the output transformer field to fully de-energize before subsequent re-energization, thus avoiding saturation of the transformer iron core, and allowing a comfortable margin of time to ensure that the switch has indeed opened before activation of the alternate power system. On the other hand, a time delay of more than approximately one millisecond could allow sufficient decay of the power bus in the digital equipment load such that the reliability of the digital data stored therein might be impaired. Accordingly, a time delay intentionally designed to be 200 microseconds would comfortably avoid such danger.

Activation of the alternate power system 22 after the dual line level sensor 28 indicates a low power condition is thus delayed. However, deactivation of the alternate power system 22 after restoration of normal line condition is virtually instantaneous as capacitor 95 charges through the low forward resistance of diode 92. In fact, ther is a short delay in the output of the deactivation signal of about 10 microseconds. This is determined by the charging time of the capacitor 95 through diode 92, as well as the input level at which the Schmitt trigger 96 changes its output state from "one" to "zero". The difference in charge and discharge path of the capacitor 95 causes the circuit to have a different time delay depending on the direction of change of state of the input signal.

In the switch control circuit 31, the "one" state output of the dual line level sensor 28 during normal line conditions is first inverted to the "zero" state at digital inverter 106 and then re-inverted at the Schmitt trigger 104 as a "one" signal to maintain the switch 20 in its closed condition. In the event of line power failure at the source 12 producing a "zero" state output from the sensor 28, the output of the Schmitt trigger 104 almost instantaneously changes to "zero" state, causing the switch 20 to open before the alternate power system 22 activating signal is delivered from the alternate power control circuit 32.

Then when power is restored and sensed at sensor 28, again producing a "one" signal from Schmitt trigger 90, this is inverted to a "zero" signal by digital inverter 106, causing the capacitor 102 to discharge through the resistor 100, causing the output of the Schmitt trigger 104 to change from "zero" state to a "one" state after a delay of e.g. 200 microseconds, giving the alternate power control circuit 32 ample time to deactivate the alternate power system 22 before the switch 20 is closed.

The operation described above ensures that the switch 20 opens before the alternate power system 22 is activated as a result of low line voltage, and that the alternate power system 22 is deactivated before the switch 20 closes, as the line voltage at 12 returns to normal.

The Control Circuit Power Supply

Figure 3:
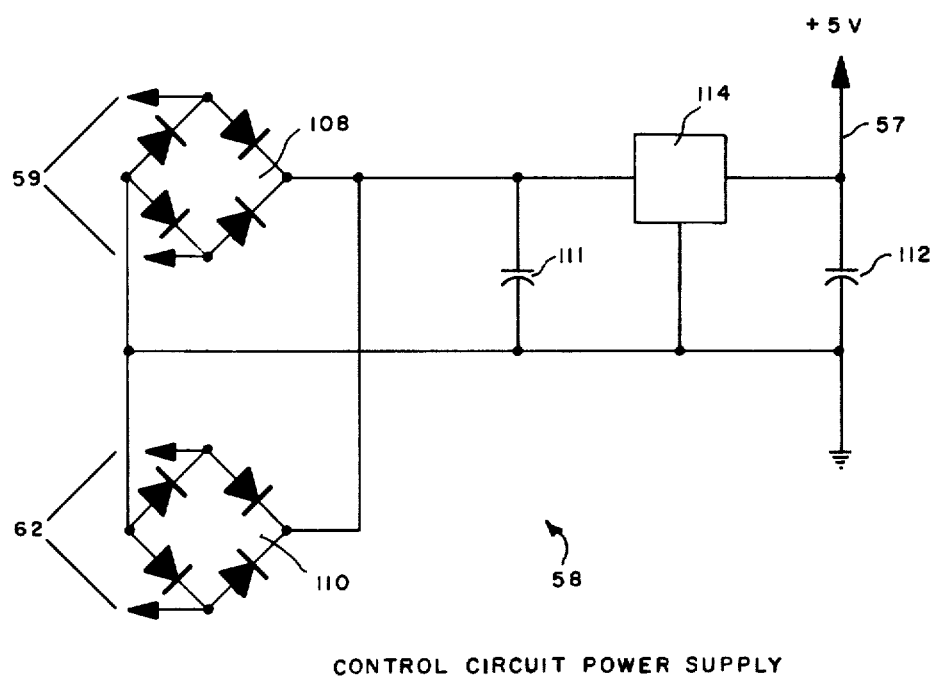
FIG. 3 is a schematic diagram of the control circuit power supply.

Referring now to FIG. 3, the conrol circuit power supply 58 comprises rectifier bridges 108 and 110 to which power is supplied through line 59 (from winding 60 on accessory transformer 25) or through line 62 (from winding 64 on output transformer 40), respectively, depending on which power system 12 or 22 (FIG. 1) is active at the time. Also included in the circuit are filter capacitors 111 and 112 and voltage regulator 114. This circuit provides the +5 v reference voltage through line 57 to the dual line level sensor 28, and +5 bus voltage to the control circuits 31 and 32, the oscillator-inverter 38, the battery charger control 49 and the logic circuit 66.

The power supply 58 is unique in that it supplies voltage not only during normal line or alternate power conditions, but also during the transition between these two conditions. During such transition, the input to voltage regulator 114 is maintained at an adequate level because the capacitance of capacitor 111 is sufficiently large that it will maintain its charge during the short transition period.

The Switch and its Power Supply

Figure 4:
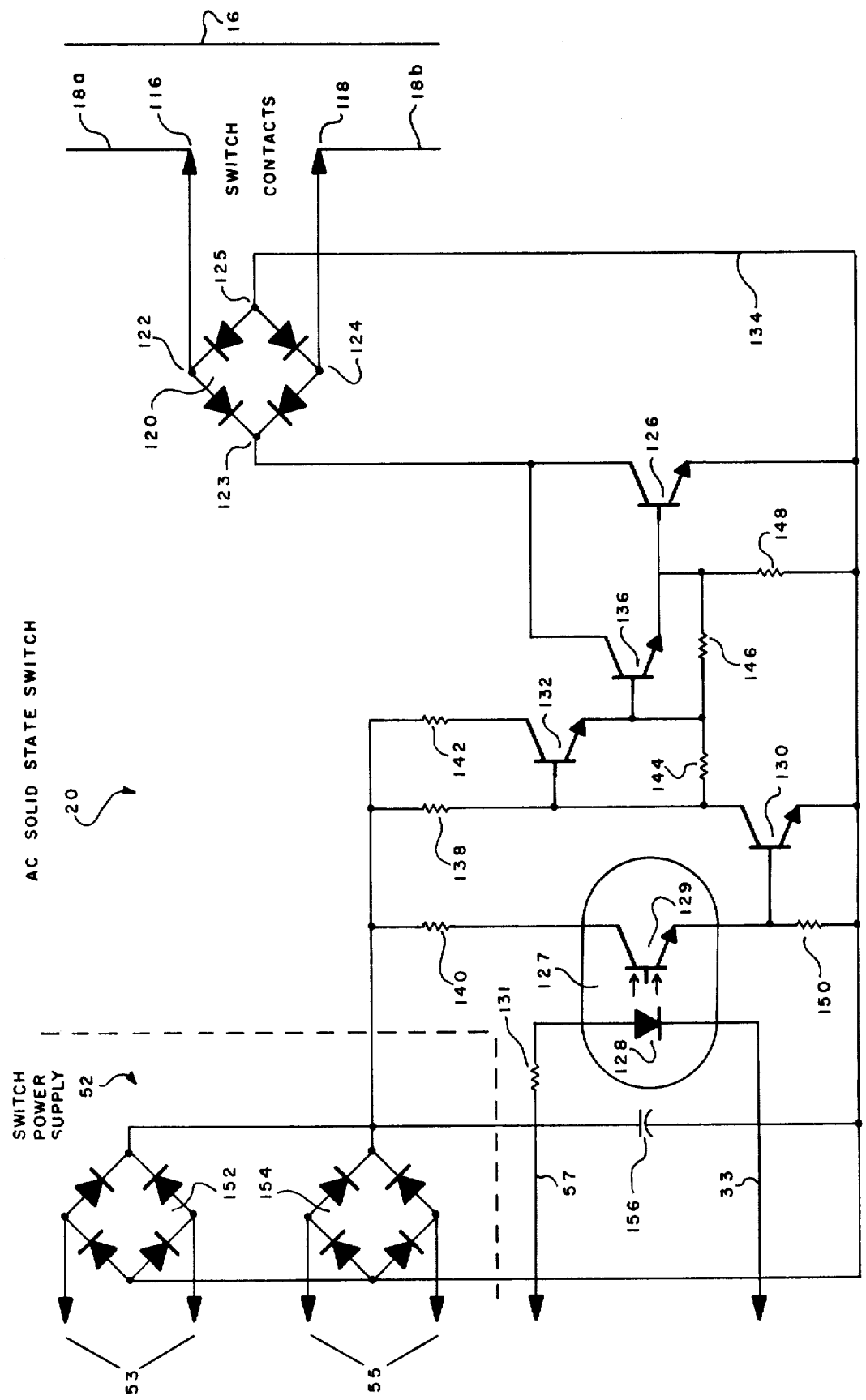
FIG. 4 is a schematic diagram of the AC solid state switch and switch power supply.

The AC solid state switch 20 and switch power supply 52 are shown in FIG. 4. The AC line to be switches (18a, b) is connected to switch contacts 116 and 118 and the AC terminals 122 and 124 of rectifier bridge 120. The rectified voltage from bridge terminals 123 and 125 is applied across transistor 126.

When transistor 126 is turned on and operated in the saturated mode, the switch 20 is effectively closed, with a voltage drop across the contacts 116 and 118 equal only to the collector to emitter saturation voltage of transistor 126 plus the two forward diode drops in the bridge 120. The sum of these voltage drops typically has a peak value of 2 to 3 volts. When transistor 126 is turned off, switch 20 is open.

The switch 20 is isolated from earth ground by optical coupler 127 and transformers 25 and 40. Switch 20 is operated by the signal delivered through line 33 from the switch control 31 (FIGS. 1, 2). When the output of Schmitt trigger 104 is low (less than 0.4 volt), a +5 volt current flows through line 57 from the control circuit power supply 58 (FIG. 3) through resistor 131, coupler diode 128 and line 33 to Schmitt trigger 104. This turns coupler transistor 129 on, and current flows from switch power supply 52 to the base of the transistor 130. The turn-on of transistor 130 clamps the base of transistor 132 to switch common 134, causing transistors 132, 136, and 120 to turn off; thus when coupler diode 128 current flows, switch 20 is in its open state.

Conversely, when the output of Schmitt trigger 104 is high (more than 4.0 volts), the voltage drop from the +5 volts of line 57 to the output of Schmitt trigger 104 is insufficient to cause current flow through coupler diode 128. Hence, the coupler transistor 129 and transistor 130 remain off. Current flow from the switch power supply 52 output is through resistor 138 to the base of transistor 132, turning on transistors 132, 136 and 126, effectively closing the switch.

Resistors 140 and 142 limit the current through the coupler transistor 129 and transistor 132, respectively. Resistors 144, 146, 148 and 150 bypass leakage currents around the base-emitter junctions when their respective transistors are in the off state. The resistors also provide a base charge discharge path when the transistors are being turned off.

The switch power supply 52 is comprised of two bridge rectifiers 152 and 154 and capacitor 156. This power supply, like control circuit power supply 58, provides power during normal line or alternate power operation and during the transition between these two conditions. The switch power supply 52 obtains its input either through line 58 (from winding 54 on the accessory transformer 25) or through line 55 (from winding 56 on the output transformer 40).

The switch 20, as described above, has the following properties. Because of its solid state nature, it is inherently fast relative to mechanical devices such as relays, with its response time (on the order of microseconds) limited only by the semiconductors used. Secondly, by rectifying the AC current to enable the use of transistors for the switching capability, the switch can be opened at any point in the AC cycle, in contrast to switches which utilize triacs or SCR's, which can be opened only after the completion of a half cycle wave form (on the order of 8 milliseconds). This property is necessary for the practical application of this invention. Thirdly, control of the switch is electrically isolated from the switch contacts by the optical coupler, so that the switch has the isolation advantages of a relay without the associated disadvantages. It is noted that isolation can be achieved by other means than optical coupling, e.g., through the use of a transformer/rectifier. Finally, the switch is not subject to wear as in the case of switches or relays employing mechanical contacts.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed is:

1. A system for delivering substantially uninterruptible AC voltage comprising:
    an input means for connection to a source of AC line voltage;
    an output means for connection to equipment requiring constant AC line voltage;
    an AC solid state switch connected between said input and said output means;
    an alternate AC power system connected between said switch and said output means;
    a sensing circuit connected between said input means and switch and operative to deliver a first state signal when AC line voltage is greater than a predetermined level and to deliver a second state digital signal when AC line voltage is less than said predetermined level;
    a first control circuit connected between said sensing circuit and said switch;
    a second control circuit connected between said sensing circuit and said alternate power system;
    means in said first control circuit to delay passage of a first state digital signal; and
    means in said second control circuit to delay passage of a second state digital signal;
    said switch being conditioned to be closed at any point in the AC cycle upon input of a first state digital signal and opened at any point in the AC cycle upon input of a second state digital signal; and
    said alternate power system being conditioned to be activated upon input of a second state digital signal and deactivated upon input of a first state digital signal.

2. The AC uninterruptible power system defined by claim 1 wherein said AC solid state switch includes:

a pair of AC contacts connected between said input and output means;

a switch rectifier bridge which has its AC terminals connected to said contacts;

a transistor connected across the DC terminals of said switch rectifier btridge;

a drive circuit means connected between said transistor and said first control circuit, and operative to drive said transistor into its saturated mode, turning it on and closing the connection across said DC terminals of said switch rectifier bridge, upon input of a switch closing signal from said first control circuit; and operative to drive said transistor into its nonconducting mode, turning it off and opening the connection across said DC terminals of said switch rectifier bridge, upon input of a switch opening signal from said first control circuit; and a switch power supply means to operate said drive circuit.

3. The AC uninterruptible power system defined by claim 2 wherein said AC solid state switch includes:

an isolating means interposed in the connection between said drive circuit means and said first control circuit.

4. The AC uninterruptible power system defined by claim 3 wherein said isolating means includes:

an optical coupler.

5. The AC uninteruptible power system defined by claim 2 wherein said switch power supply means includes:

an accessory transformer including a secondary winding connected to said input means;

one switch power supply rectifier bridge connected to said accessory transformer secondary winding;

an output transformer including a secondary winding connected to said output means;

another switch power supply rectifier bridge connected to said output transformer secondary winding; and means connecting the DC terminals of said switch power supply rectifier bridges in parallel.

6. The AC uninterruptible power system defined by claim 1 wherein said sensing circuit includes:

a sensing circuit rectifier bridge with its AC terminals connected to said input means;

a filter capacitor connected across the DC terminals of said sensing circuit rectifier bridge;

means providing a first fixed reference voltage; and comparator means connected to said filter capacitor and said first reference voltage means, and conditioned to compare their respective voltages and deliver a said first state signal to said first and second control circuits when the voltage from said filter capacitor is at voltage levels above said first reference voltage, and deliver a said second state signal to said first and second control circuits when the voltage from said filter capacitor is at voltage levels below said first reference voltage.

7. The AC uninterruptible power system defined by claim 1 wherein said sensing circuit includes:

a dual line level sensor conditioned to change the state of the delivered signal from said first state to said second state when said AC line voltage decreases below a first predetermined level and to change the state of the delivered signal from said second state to said first state when said AC line voltage increases above a second higher predetermined level.

8. The AC uninterruptible power system defined by claim 7 wherein said dual line level sensor includes:

a sensing circuit rectifier bridge with its AC terminals connected to said input means;

a filter capacitor connected across the DC terminals of said sensing circuit rectifier bridge;

means providing a first fixed reference voltage;

comparator means including an inverting input connected to said filter capacitor, and a non-inverting input, and conditioned to compare signals applied to said inputs and to deliver a most negative digital signal when the signal applied to said inverting input exceeds the signal applied to said non-inverting input, and to deliver a most positive digital signal when the signal applied to said non-inverting input exceeds the signal applied to said inverting input;

means providing a second reference voltage proportional to the output signal of said comparator means;

means for summing said first and second reference voltages; and means for delivering said summed voltages to said comparator non-inverting input.

9. The AC uninterruptible power system defined by claim 8 wherein said comparator means includes:

a Norton-type differential amplifier.

10. The AC uninterruptible power system defined by claim 1 wherein each of said control circuit delay means includes:

a Schmitt trigger including an input thereto;

a diode connected between said sensing circuit and said Schmitt trigger input;

a resistor connected between said sensing circuit and said Schmitt trigger input; and a capacitor connected between said Schmitt trigger input and earth ground.

11. The AC uninterruptible power system defined by claim 1 wherein said second control circuit delay means includes:

a digital inverter interposed in the connection between said sensing circuit and said second control circuit.

12. The AC uninterruptible power system defined by claim 1 wherein said alternate AC power system includes:

a battery as a source of DC power;

an oscillator-inverter means connected to said battery to convert said DC power to AC power;

an output transformer means connected to said oscillator-inverter means; and an output transformer secondary winding connected across said output means.

13. The AC uninterruptible power system defined by claim 12 wherein said alternate AC power system includes:

a battery charger means connected between said battery and output means.

14. The AC uninterruptible power system defined by claim 13 wherein said alternate AC power system includes:

an additional output transformer secondary winding;

said battery charger means being connected between said additional output transformer secondary winding and said battery, so as to charge said battery with power derived from said output means via said output transformer secondary windings; and said battery charger means being connected to said second control circuit, and conditioned to activate upon input of said first state signal from said second control circuit, and deactivate upon input of said second state signal from said second control circuit.

15. The AC uninterruptible power system defined by claim 1 including:
a first logic circuit connected to said first control circuit and adapted for connection to equipment requiring constant AC line voltage, and conditioned to deliver a first statue signal indicating line or battery operation upon receipt of a first state or second state signal, respectively, from said first control circuit; and
a second logic circuit connected to said battery charger means and adapted for connection to said equipment requiring constant AC line voltage, and conditioned to deliver a second status signal indicating the battery voltage above or below a given level.

16. The AC uninterruptible power system defined by claim 1 including:
a digital signal input and circuit means connected to said alternate AC power system and adapted for connection to equipment requiring constant AC line voltage, and conditioned to deactivate said alternate AC power system upon receipt of a deactivation signal from said equipment.

17. The AC uninterruptible power system defined by claim 1 including a control circuit power supply means comprising:
one control circuit power supply rectifier bridge with its AC terminals connected to said input means;
another control circuit power supply rectifier bridge with its AC terminals connected to said output means; and
a filter capacitor connected across the DC terminals of said control circuit power supply rectifier bridges.

* * * * *